(No Model.)

W. W. VIRTUE.
MECHANISM FOR CONVERTING MOTION.

No. 491,910. Patented Feb. 14, 1893.

Witnesses
Chas. E. Riordon.
Wm. S. Hodges

Inventor
Wm. W. Virtue
By Butterworth & Dowell
his Attorneys

UNITED STATES PATENT OFFICE.

WILLIAM WRIGHT VIRTUE, OF SYDNEY, NEW SOUTH WALES.

MECHANISM FOR CONVERTING MOTION.

SPECIFICATION forming part of Letters Patent No. 491,910, dated February 14, 1893.

Application filed December 31, 1891. Serial No. 416,638. (No model.) Patented in New South Wales February 2, 1891, No. 2,781; in New Zealand June 4, 1891, No. 5,026; in South Australia June 6, 1891, No. 1,952, and in England July 22, 1891, No. 12,743.

*To all whom it may concern:*

Be it known that I, WILLIAM WRIGHT VIRTUE, a subject of the Queen of Great Britain, residing in Sydney, in the Colony of New South Wales, have invented a new and useful Mechanism for Converting Rotary into Reciprocating Motion, of which the following is a specification, and for which patents have been obtained in the following countries, to wit: New South Wales, No. 2,781, dated February 2, 1891; South Australia, No. 1,952, dated June 6, 1891; New Zealand, No. 5,026, dated June 4, 1891, and England, No. 12,743, dated July 22, 1891.

This invention of mechanism for converting rotary into reciprocating motion in planes coincident with the axis of rotation, has for its object the reduction of friction and of loose working and vibration; it is applicable to a great variety of machines, including shearing and clipping machines and sewing machines, and is of special utility where a vibratory motion is required at the end of a shaft line with a minimum expenditure of space for containing the motion converting mechanism.

The essential principle of the invention consists in setting an overhung pin or its mechanical equivalent upon a rotating shaft in such a way that the center-line of such overhung pin will if produced intersect the axis of vibration of a lever-bar, that axis being so placed as also to be met by the axis of rotation of the shaft if the latter were produced.

Figures 1, 5:
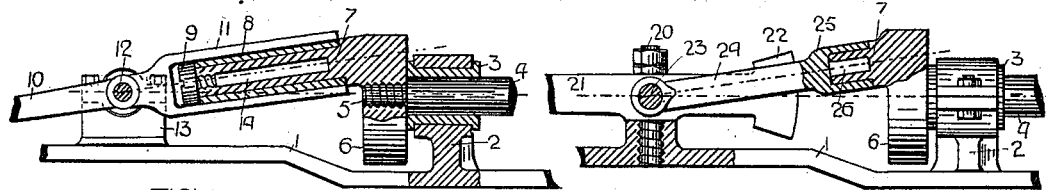
Figures 2, 6:
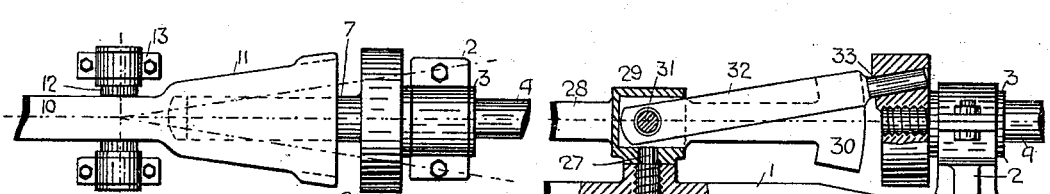
Figures 3, 7:
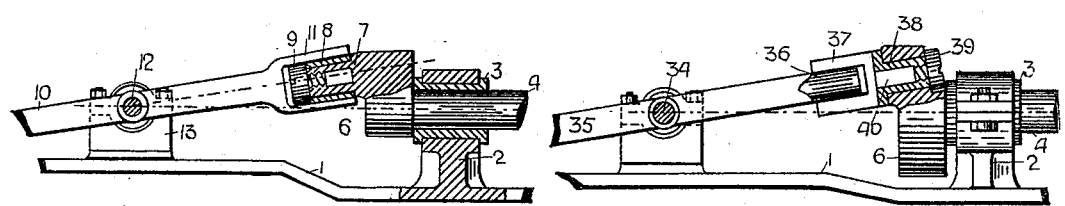
Figures 4, 8:
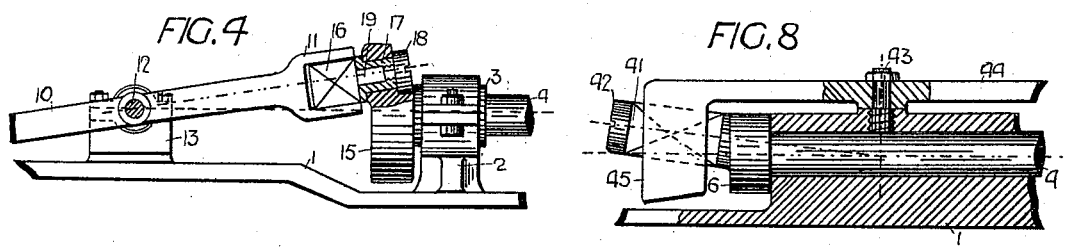

Referring to the annexed sheet of explanatory drawings generally illustrative of methods of application of the invention, Figures 1, 3, 4, 5, 6, 7, and 8 are sectional elevations, and Fig. 2 a plan of the mechanism shown in Fig. 1. The designs shown in Figs. 1 and 3 differ only in the length of the forks or jaws on the vibrating lever and in the length of the eccentric pin. In Fig. 4 an alternative method of construction and setting of the eccentric pin is shown. Figs. 5 and 6 illustrate methods of arrangement and construction of parts when the overhung eccentric pin is used in combination with an intermediate lever or connecting-bar with conical-pendular motion. Fig. 7 illustrates a construction wherein the "motion block" is forked. The method of arrangement and construction of the parts when the center of vibration is rearward of the end of the rotating shaft is shown in Fig. 8.

Figs. 1, 2, 3, 4, and 7 illustrate the mechanism arranged to vibrate the bar in a vertical plane; and Figs. 5, 6, and 8 the mechanism arranged to vibrate the bar in a horizontal plane. In all the constructions shown in these figures the principle is the same. The several modifications differ from one another in constructive details only.

The same figures of reference indicate corresponding and similar parts in all the figures.

Referring to Figs. 1, 2, and 3, 1 is the bed, 2 shaft bearing, 3 brasses, 4 shaft, 5 screwed end of shaft, 6 balanced disk or crank integral with or secured to the shaft 4 by screwing or otherwise, 7 overhung eccentric pin or shaft cored out to form an internal oil reservoir 14, 8 bush or bearing fitting truly about the pin or shaft 7 and formed square exteriorly and exactly fitting the space between the lever wings 11 of the vibrating piece 10, 9 screwed plug and nut, 12 fulcrum pin, 13 plummer block.

Referring to Fig. 4 the solid square motion block 16 takes the place of the overhung eccentric pin or shaft 7 and the bushing 8; 17 is the shank of the motion block 16, 18 back-nut, 19 internal oil reservoir.

Referring to Fig. 5, 20 is the center pin of the vibrating bar 21, 22 expanded tail piece on same, 23 center pin of gyrating forked lever bar 24, 25 bored end of bar 24, 26 oil chamber. The part 7 must be turned radially to the point of intersection of the centers 20 and 23, and the shaft 4 is set so that its axis if produced would cut that point, radial to which also the part 7 is bored. The construction shown in Fig. 6 is analogous to that last described. 27 is the center-pin of the vibrating bar 28 which bar is bifurcated rearward of the center where it is provided with two bridge pieces 29 which form bearings for the pins 27, 30 are expanded tail pieces, 31 center-pin of the gyrating lever set at right angles to the pin 27, 32 is the gyrating lever turned at the rear end 33 to fit a hole in the part 6 bored radially to the point of intersection of the centers 27 and 31, the shaft 4 must be set so that its axis if produced would also cut that point of intersection.

The parts 6, 7, and 25 shown in Fig. 5 may be substituted for the parts 6 and 33 shown in Fig. 6, and vice-versa.

Fig. 7 illustrates a modified construction of a motion block and a solid vibrating bar; the motion block is forked so as to grasp the head (or the tail as the case may be) of the vibrating bar; otherwise the construction is as shown in Fig. 4. 34 is the center-pin of the vibrating lever 35, which is provided with an expanded head 36, 37 jaws or claws of motion block, 38 shank of same, 39 back-nut, 40 oil chamber.

Referring to Fig. 8 in which the fulcrum is shown rearward of the point at which motion is applied, it will be seen that the overhung pin or shaft is struck outward, and not inward as shown in previous figures; otherwise the construction is practically identical. 41 is the square bushing or bearing, 42 screwed plug and nut, 43 center pin of the vibrating bar 44, 45 cheek piece of the bar 44. It will be evident that the construction of the motion block shown in Fig. 7 may be adapted to the combination of parts shown in Fig. 8.

When a motion block or mechanism such as is shown in Figs. 1, 2, 3, 4, 7, or 8 is used it is only essential that the axis of rotation and the axis of vibration should be in the same plane, but when connecting bars such as are shown in Figs. 5 or 6 are used it is only essential that the axis of rotation and the axis of the overhung pin should if produced always cut one another in the axis of vibration of the lever.

In carrying out and applying my invention, I do not restrict myself to any particular construction of mechanism as long as the essential principle is retained of setting the rotating parts and the overhung pin in such a way that their axes if produced would intersect the axis of vibration.

It will be apparent that the pin or spindle which engages the lever, will have a lateral motion along or within the lever, such motion being in the direction of the axis of vibration.

Having now particularly described and ascertained the nature of this invention and in what manner the same is to be performed, I claim,—

1. A mechanical movement comprising a vibrating lever, a rotating body carrying a pin or spindle engaging with the lever, and arranged to impart thereto motion in the direction of vibration, and to move freely along the same laterally in the direction of the axis of vibration, substantially as described.

2. A mechanical movement comprising a vibrating lever, a body rotating about an axis which intersects the axis of vibration, a pin or spindle carried by the rotating body which engages with the lever so as to impart thereto motion in the direction of vibration, and to move freely along the same laterally in the direction of the axis of vibration, substantially as described.

3. The combination in a mechanical movement of a vibrating lever, a rotating body carrying a pin or spindle directed toward the intersection of the axes of rotation and vibration, and engaging with the lever so as to impart thereto motion in the direction of vibration, and to move freely along the same in the direction of the axis of vibration, substantially as described.

4. The combination in a mechanical movement of a vibrating lever provided at one end thereof with cheeks or jaws parallel with the axis of vibration, a rotating body carrying a pin or spindle directed toward the intersection of the axes of rotation and vibration, and engaging with the lever between the cheeks or jaws thereof, substantially as described.

5. The combination in a mechanical movement of a vibrating lever, a body rotating about an axis which intersects the axis of vibration, a pin or spindle one end of which is pivoted on an axis passing through the intersection of the axes of rotation and vibration, and the other end secured eccentrically on the rotating body, the pin or spindle engaging with the lever so as to impart thereto motion in the direction of vibration and to move freely along the same in the direction of the axis of vibration, substantially as described.

6. The combination in a mechanical movement of a vibrating lever provided at one end thereof with cheeks or jaws parallel with the axis of vibration, a rotating body carrying a pin or spindle, one end of which is pivoted on an axis passing through the intersection of the axes of rotation and vibration at right angles to them, and the other secured eccentrically on the rotating body, the pin or spindle engaging with the lever between the cheeks or jaws thereof, substantially as described.

7. The combination of a rotating disk or body, a pin overhung therefrom eccentrically, and a vibrating lever with cheeks or jaws, engaged by said overhung pin the parts being so arranged that the axis of rotation and axis of the overhung pin if produced would intersect one another in the axis of vibration, substantially as described.

8. The combination with a rotating shaft and a vibratory lever, of an overhung pin rotating with said shaft and engaging said lever so as to impart motion thereto, said pin and shaft being arranged so that their axes if produced would intersect the axis of vibration, substantially as described.

WILLIAM WRIGHT VIRTUE.

Witnesses:
C. G. HEPBURN,
    *F. M. Brit. Inst. P. A.*
W. I. SPINSON,
    *Fell. Aust. Inst. P. A.*